(12) United States Patent
Kirby

(10) Patent No.: US 9,066,585 B2
(45) Date of Patent: Jun. 30, 2015

(54) STORAGE RACK, FLEXIBLE MOMENT FRAME FOR REDUCING SEISMIC DAMAGE TO STORED GOODS

(75) Inventor: Andrew L. Kirby, Agoura Hills, CA (US)

(73) Assignees: Andrew L. Kirby, Agoura Hills, CA (US); Hannibal Industries, Inc, Los Angeles, CA (US)

( * ) Notice: Subject to any disclaimer, the term of this patent is extended or adjusted under 35 U.S.C. 154(b) by 340 days.

(21) Appl. No.: 13/374,326

(22) Filed: Dec. 20, 2011

(65) Prior Publication Data
US 2014/0202968 A1    Jul. 24, 2014

(51) Int. Cl.
*A47B 57/40* (2006.01)
*A47B 47/00* (2006.01)
*B65G 1/02* (2006.01)
*A47B 47/02* (2006.01)
*A47B 57/44* (2006.01)
*A47B 57/48* (2006.01)
*A47B 96/14* (2006.01)

(52) U.S. Cl.
CPC ............ *A47B 47/0083* (2013.01); *A47B 57/40* (2013.01); *B65G 1/02* (2013.01); *A47B 47/027* (2013.01); *A47B 57/44* (2013.01); *A47B 57/485* (2013.01); *A47B 96/1408* (2013.01); *A47B 96/1433* (2013.01); *A47B 96/1441* (2013.01)

(58) Field of Classification Search
CPC .. A47B 47/027; A47B 47/028; A47B 47/021; A47B 47/02; A47B 55/00; A47B 57/44; A47B 57/40; A47B 57/402; B65G 1/026; B65G 2207/02; B65G 2207/40
USPC .......... 211/182, 189, 187, 191, 192, 193, 194
See application file for complete search history.

(56) References Cited

U.S. PATENT DOCUMENTS

| | | | | |
|---|---|---|---|---|
| 2,937,767 A | * | 5/1960 | Butler et al. | 211/191 |
| RE25,114 E | | 1/1962 | Edwards, Jr. | |
| 3,266,635 A | * | 8/1966 | McConnell | 211/191 |
| 3,523,613 A | * | 8/1970 | Konstant | 211/191 |
| 3,685,665 A | | 8/1972 | Atwater | |
| 3,879,144 A | * | 4/1975 | Eckerbrecht | 403/232.1 |
| 4,030,611 A | | 6/1977 | Konstant | |
| 4,053,246 A | | 10/1977 | Uccello | |
| 4,261,470 A | * | 4/1981 | Dolan | 211/191 |
| 5,014,487 A | * | 5/1991 | King | 52/844 |
| 5,180,068 A | * | 1/1993 | Vargo | 211/191 |

(Continued)

FOREIGN PATENT DOCUMENTS

| | | | | |
|---|---|---|---|---|
| DE | 3903170 A1 | * | 8/1990 | A47B 47/00 |
| EP | 154704 A2 | | 9/1985 | |
| EP | 269425 A1 | * | 6/1988 | B65G 1/02 |

*Primary Examiner* — Patrick Hawn
(74) *Attorney, Agent, or Firm* — Edwin H. Crabtree; Ramon L. Pizarro

(57) ABSTRACT

A storage rack having a flexible moment frame adapted for receiving pallets with stored goods. The frame flexes or floats when a vector, lateral force "V" is applied thereto, such as an earthquake. The frame includes spaced apart vertical posts. A plurality of sets of horizontal load and cross beams are releasably attached along a length of the vertical posts. When the lateral, vector force "V" is applied to the moment frame, a top portion of the frame is displaced from the vertical at an angle "Δ Flexible". This angle is greater than an angle "Δ Rigid" for similar storage racks with rigid frames. Thus with this angle of flexibility, the moment frame reduces potential damage to the stored goods.

2 Claims, 3 Drawing Sheets

(56) References Cited

U.S. PATENT DOCUMENTS

| | | | |
|---|---|---|---|
| 5,312,004 A | 5/1994 | Krummell et al. | |
| 5,624,045 A * | 4/1997 | Highsmith et al. | 211/192 |
| 5,964,361 A | 10/1999 | Mefford et al. | |
| 6,062,400 A | 5/2000 | Schieler et al. | |
| 6,260,719 B1 | 7/2001 | Azzopardi et al. | |
| 6,332,549 B1 * | 12/2001 | MacDonald | 211/183 |
| 6,682,253 B2 * | 1/2004 | Binna et al. | 403/263 |
| 8,302,788 B2 * | 11/2012 | Vargo et al. | 211/186 |
| 2004/0155003 A1 * | 8/2004 | Anderson et al. | 211/191 |
| 2006/0237378 A1 * | 10/2006 | Pellegrino et al. | 211/29 |
| 2010/0181274 A1 * | 7/2010 | Vargo et al. | 211/187 |

\* cited by examiner

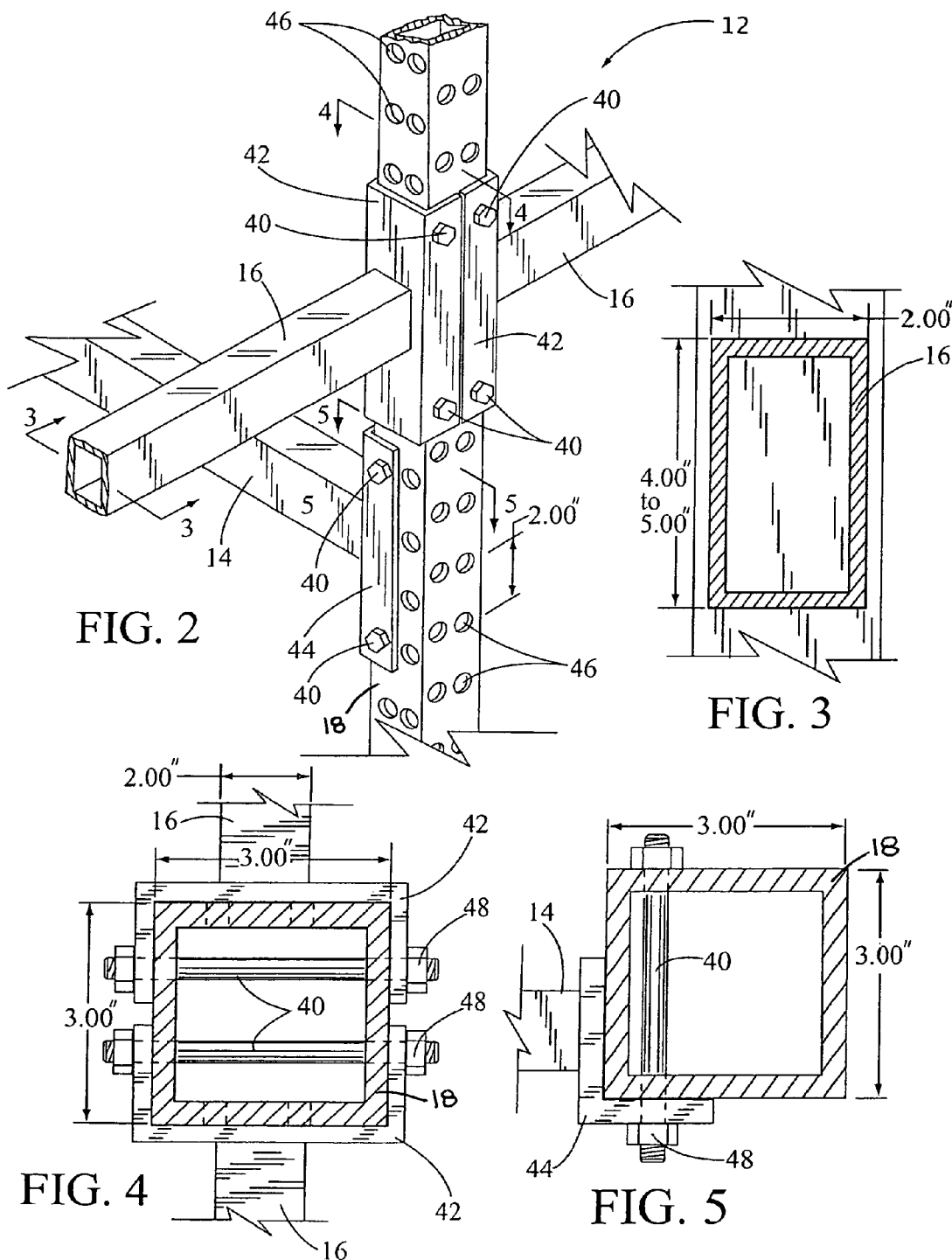

US 9,066,585 B2

STORAGE RACK, FLEXIBLE MOMENT FRAME FOR REDUCING SEISMIC DAMAGE TO STORED GOODS

BACKGROUND OF THE INVENTION (a) Field of the Invention

This invention relates to a storage rack used for holding pallets of stored goods and more particularly, but not by way of limitation, to a storage rack having a flexible moment frame. The flexible moment frame is capable of sufficient flex or float during an earthquake to prevent collapse of the frame and damage to the stored goods received on pallets.

(b) Discussion of Prior Art

Earthquakes are daily occurrences around the world and caused by a release of energy in the earth's crust. This release of energy creates seismic waves, measured using seismometers. An earthquake of a magnitude 3 or less is almost imperceptible. But, an earthquake of a magnitude from 5 to 7 and greater can cause great damage to building structures. The subject invention is designed to address potential damage to stored goods in a building when a seismic, lateral force is applied, caused by an earthquake.

With the advent of large forklifts capable of raising pallets with goods thereon and placing the pallets on storage racks 12, 18, 24 feet and higher, the tall storage racks are now subject to swaying, collapsing or toppling over during a severe earthquake, thus causing damages to the stored goods.

In U.S. published applications 2006/0237378 to Pellegrino et al. and 2002/0117462 to Hung, two different types of flexible storage racks are disclosed for seismic vibration absorption and dissipation. In one of these applications, a vibration isolator is installed at the base of the rack along with added diagonal bracing for stiffening the rack frame. These two storage racks are complex in design with additional frame and base structure not required in the subject invention.

The subject invention is simplistic in design with unique structural engineering features and advantages not found in previous large and tall metal storage racks used inside a building or outside the building.

SUMMARY OF THE INVENTION

In view of the foregoing, it is a primary objective of the subject invention to provide a storage rack having a flexible moment frame that is capable of flexing or lateral drift during an earthquake and thus prevent damage to goods stored on the frame.

Another object of the storage rack is the moment frame can be assembled in the field without welding of parts. Also, the frame components are interchangeable and can be used to build the frame to various heights. Further, a length and width of the moment frame can be increased when additional storage is required.

Yet another object of the invention is the flexible moment frame is simplistic in design. Also, the frame uses standard, angular shaped, hollow metal posts with comparable frame weight, increased flexibility and at a reduced storage rack cost.

The storage rack includes a flexible moment frame adapted for receiving pallets with stored goods thereon. The moment frame flexes or floats when a vector, lateral force "V" is applied thereto, such as an earthquake. The frame includes spaced apart first, second, third and fourth vertical posts. Lower ends of the vertical posts are mounted on horizontal base plates. The base plates are anchored to a floor surface.

A first set of load beams includes a first horizontal load beam with opposite ends releasably attached to the first and second vertical posts and a second horizontal load beam with opposite ends releasably attached to the third and forth vertical posts. A first set of cross beams includes a first horizontal cross beam with opposite ends of the first cross beam releasably attached to the first and third vertical posts and a second horizontal cross beam with opposite ends of the second cross beam releasably attached to the second and forth vertical posts.

When the lateral force "V" is applied to the moment frame, a top portion of the moment frame is displaced from the vertical at an angle "Δ Flexible". This angle is greater than an angle "Δ Rigid" for similar storage racks with rigid frames. Thus with this angle of flexibility, the flexible moment frame reduces potential damage to the stored goods on the storage rack.

These and other objects of the present invention will become apparent to those familiar with the storage racks and frames designed to withstand seismic forces when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the storage rack with flexible moment frame, and in which:

FIG. 2 is an enlarged perspective view of a portion of the flexible moment frame with a pair of horizontal cross beams with "U" shaped saddle connectors bolted to opposite sides of a vertical post. Also, a portion of a horizontal load beam is shown with a "L" shaped flange connector bolted to a side of the vertical post.

FIG. 3 is a cross sectional view of one of the cross beams taken along lines 3-3, shown in FIG. 2.

FIG. 4 is a cross sectional view of one of the vertical posts taken along lines 4-4, shown in FIG. 2.

FIG. 5 is another cross sectional view of the vertical posts taken along lines 5-5, shown in FIG. 2.

DETAILED DESCRIPTION OF THE PREFERRED EMBODIMENTS

Figure 1:
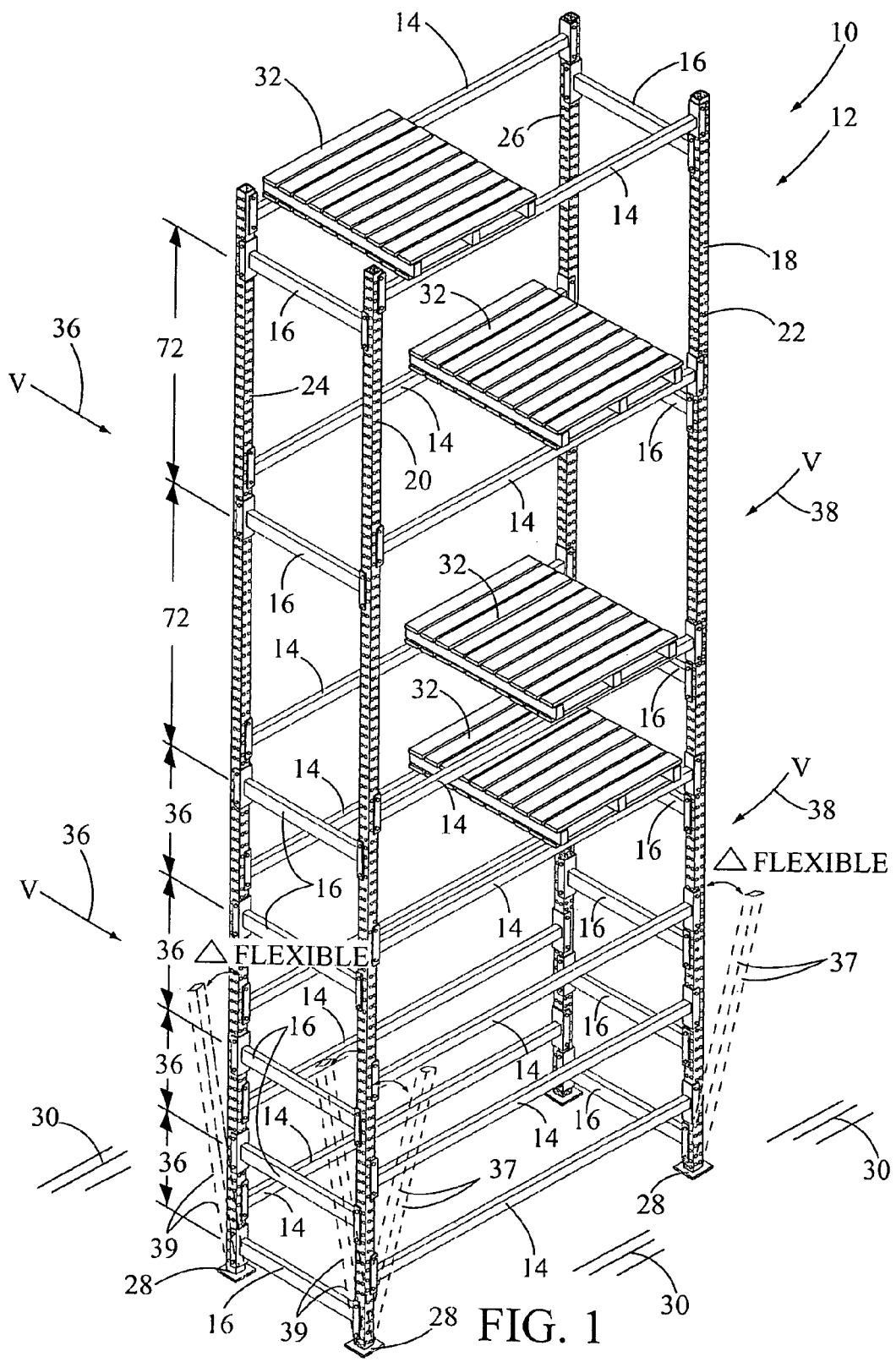
FIG. 1 is a perspective view of the subject storage rack with a flexible moment frame having a plurality of sets of horizontal load beams and cross beams disposed one on top of the other and releasably attached to four vertical posts. As an example, four of the sets of load beams are shown having wooden pallets received thereon for holding various goods.

In FIG. 1, a perspective view of the subject storage rack is shown having a general reference numeral 10. The storage rack 10 includes a flexible moment frame, having a general reference numeral 12. The moment frame 12 is made up of a plurality of sets of horizontal load beams 14 and horizontal cross beams 16, disposed one on top of the other and releasably attached to sides of four, spaced apart, vertical posts 18. The posts 18 include a first post 20, a second post 22, a third post 24 and a forth post 26.

Figures 6, 7, 8:
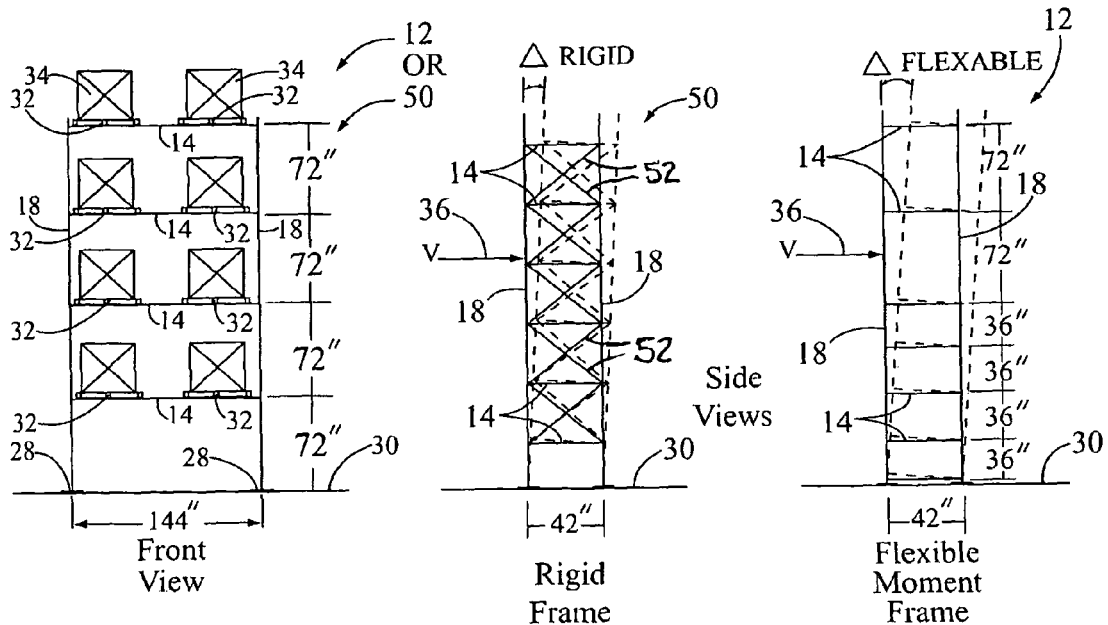
FIG. 6 is a front view of either a rigid frame, shown in FIG. 7, or the subject flexible moment frame, shown in FIG. 8, with a series of pallets with goods received on the frame's load beams.
FIG. 7 is a side view of a rigid frame with a vector force "V" applied thereto and along a width of the frame. The rigid frame is shown leaning to the right from the vertical and at an angle "Δ Rigid".
FIG. 8 is a side view of the subject flexible moment frame with the vector force "V" applied thereto and along a width of the frame. The flexible moment frame is shown leaning to the right from the vertical and at an angle "Δ Flexible".

A bottom of the vertical posts 18 is mounted on frame base plates 28 and anchored to a floor surface 30. Four of the upper load beams 14 are shown having wooden pallets 32 received thereon for holding various stored goods 34. An example of stored goods 34 on the pallets 32 is shown in FIG. 6.

A vector force "V", shown as arrows 36 along a width of the frame 12, can apply such a lateral force to flex or drift the frame 12, shown in dashed lines 37, at an angle "Δ Flexible" and without the collapse of the rack 10. Likewise, the vector force "V", shown as arrows 38 along a length of the frame 12, can apply such a lateral force to flex or drift the frame 12, shown in dashed lines 39, at an angle "Δ Flexible" and without collapse of the rack 10.

In this drawing, three lower sets of load beams 14 and cross beams 16 are shown without pallets and spaced apart every 36 inches. A forth set of load beams 14 and cross beams 16 is shown disposed above the floor surface 30 and holding a pallet 32. Additional sets of load beams 14 and cross beams 16 are disposed above the fourth set of load and cross beams and spaced apart 36 inches, 72 inches and another 72 inches. Obviously from reviewing this drawing, any number of set of load beams 14 and cross beams 16, secured to the four vertical posts 18, can be disposed at different heights on the posts 18 for receiving different sizes and types of goods on the pallets. Also, the width and length of the rack 10 can be expanded with added vertical posts, load beams and cross beams.

During the assembly of the flexible moment frame 12 in the field and on the floor surface 30, a first set of load beams 14 and cross beams 16 are releaseably attached to the vertical posts 18. Opposite ends of a first load beam 14 are releaseably attached to the first and second vertical posts 20 and 22, using bolts 40, shown in FIG. 5. Opposite ends of a second load beam 14 are releasably attached to the third and forth vertical posts 24 and 26. The first and second load beams 14 are parallel to each other and disposed at the same height above the floor surface 30.

A first set of cross beams 16 are now attached to the vertical posts 18 and below or above the load beams 14. Opposite ends of a first cross beam 16 are releasably attached to the first and third vertical posts 20 and 24. Opposite ends of a second cross beam 16 are releasably attached to the second and forth vertical posts 22 and 26. The first and second cross beams 16 are parallel to each other and disposed at the same height above the floor surface 30. This assembly is repeated with any number of sets of load beams and cross beams attached along the height of the four vertical posts with pallets placed on top of the load beams.

In FIG. 2, an enlarged perspective view of a portion of the flexible moment frame 12 is shown with a pair of horizontal cross beams 16 having opposite ends with "U" shaped saddle connectors 42 bolted to opposite sides of a vertical post 18.

Also, a portion of a horizontal load beam 14 is shown with a "L" shaped flange connector 44 bolted to a side of the vertical post 18. It should be noted, the vertical post 18 includes a plurality of pairs of bolt holes 46 along the length and its sides for receiving the attachment bolts 40. The bolt holes 46 are spaced apart 2 inches and off set for the holes on the adjacent sides of the post.

The use of the "U" shaped saddle connectors 42 on the opposite ends of the cross beams 16 and the "L" shaped flange connectors 44 on the opposite ends of the load beams 14 provide for bending resistance against the sides of the vertical posts 18. This resistance to bending allows for increased flexing of the moment frame 12, when a vector force "V" is applied to the storage rack 10.

Also of importance is the "U" shaped saddle connectors 42 ensures a symmetrical load connection between the cross beams 16 and the posts 14 and the cross beams 16, as opposed to an unwanted eccentric connection. Eccentric load connections on a storage rack, similar to the subject invention, can cause twisting of the horizontal beams and the vertical posts, thereby substantially reducing the frame load rating capacity. Also, each of the saddle connectors 42 receive a pair of bolts 40 therethrough and through the post 14 for increasing the strength and the stiffness of the load connection between the cross beams and vertical posts.

In FIG. 3, a cross sectional view of one of the cross beams 16 is shown and taken along lines 3-3, shown in FIG. 2. The cross beams 16 are made of a hollow steel metal, with a width of 2 inches and a height in a range of 4 to 5 inches.

In FIG. 4, a cross sectional view of one of the vertical posts 18 is illustrated and taken along lines 4-4, shown in FIG. 2. The vertical posts 18 are made of a hollow steel metal, with a square width of 3 by 3 inches. In this drawing, a portion of two cross beams 16 are shown with the "U" shaped saddle connectors 42 bolted to the opposite sides of the post 18 and secured thereto using bolts 40 and threaded nuts 48.

In FIG. 5, another cross sectional view of one of the vertical posts 18 is shown and taken along lines 5-5, shown in FIG. 2. In this drawing, a portion of one of the load beams 14 is shown with the "L" shaped flange connector 44 bolted to one side of the post 18 and attached thereto using a bolt 40 and threaded nut 48.

In FIG. 6, a front view of either a rigid frame, having a general reference numeral 50 shown in FIG. 7, or the subject flexible moment frame 12, shown in FIG. 8. The frame is shown with a series of pallets 32 with stored goods 34 received on the frame's load beams 14. The frame 12 or 50 can have a length, for example, of 144 inches and a width of 42 inches.

In FIG. 7, a side view of the rigid frame 50 is illustrated with the vector force "V", shown as arrow 36, applied thereto. The rigid frame 50 is shown leaning to the right from the vertical and at an angle "Δ Rigid". In this drawing, it should be noted that the rigid frame 50 includes diagonal bracing 52 to add rigidity to the frame. With the subject flexible moment frame 12, additional diagonal bracing 52 isn't required, since the bracing would hinder the flexing or drift of the moment frame, when a vector force is applied.

In FIG. 8, a side view of the subject flexible moment frame 12 is shown with the vector force "V", shown as arrow 36, applied thereto. The flexible moment frame 12 is also shown leaning to the right from the vertical and at an angle "Δ Flexible". Through structural testing of the components making up the frame 12, it has been found the angle "Δ Flexible" is far greater than the angle "Δ Rigid". Structural stiffness "K" equals 1 over Δ. Thus, the flexible moment frame 12 has a stiffness less than the stiffness of the rigid frame 50. Also, the fundamental period of vibration of the rack system "T" is equal to $$2\pi\sqrt{\frac{M}{K}}$$

with M being mass.

Figure 9:
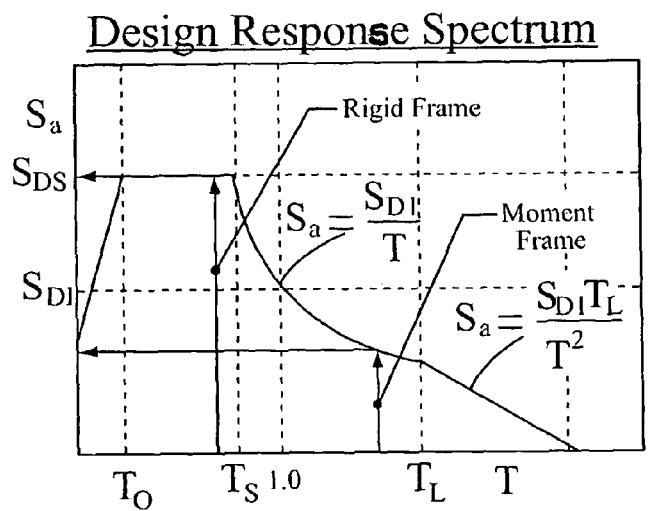
FIG. 9 is a design response spectrum graph illustrating a horizontal line "T", wherein T is the structural period of vibration. A vertical line "Sa" is shown, which illustrates coefficients for a building site and soil type, subject to a lateral force during an earthquake.

In FIG. 9, by knowing the fundamental period "T", a design based shear "Sa, the later design force applied to the lateral force resisting system during an earthquake" can be determined. In the graph shown in FIG. 9, SDS plus SDI are specific to the location of the storage rack 1—and a function of the soil type. These coefficients or parameters are provide by the United States Geological Survey. They are:

$$S_a, S_{DS}, S_{D1}, T_0, T_S, T_L, T, S_a = \frac{S_{D1}}{T}, S_a = \frac{S_{D1}T_L}{T^2}$$

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A storage rack having a flexible moment frame for field installation, the moment frame adapted for receiving pallets with stored goods thereon, the moment frame configured to flex and float when a lateral force is applied along a width or a length of the moment frame, the moment frame comprising:

first, second, third and fourth angular, hollow metal, spaced apart, vertical posts, lower ends of the vertical posts mounted on horizontal base plates, the base plates adapted for receipt on a floor surface, the vertical posts having four closed sides along a length thereof for added strength during flexing of the moment frame;

a first set of load beams disposed along the length of the moment frame, the first set including a first angular, hollow metal, horizontal load beam, opposite ends of the first load beam including a L shaped flange connector for attachment to the first and second vertical posts, the first set of load beams including a second angular, hollow metal, horizontal load beam, opposite ends of the second load beam including a L shaped flange connector attached to the third and fourth vertical posts, the first and second load beams parallel to each other and disposed at the same height above the floor surface, the L shaped flange connectors providing bending resistance against the sides of the vertical posts; and a first set of cross beams disposed along the width of the moment frame, the first set including a first angular, hollow metal, horizontal cross beam, opposite ends of the first cross beam including a U shaped saddle connector symmetrically and releasably attached to the first and third vertical posts, the first set of cross beams including a second angular, hollow metal, horizontal cross beam, opposite ends of the second cross beam including a U shaped saddle connector symmetrically and releasably attached to the second and fourth vertical posts, the first and second cross beams parallel to each other and disposed at the same height above the floor surface, the U shaped saddle connectors provide for bending resistance against the sides of the vertical posts and a symmetrical load connection between the cross beams and the vertical posts, the bending resistance against the vertical posts allows for flexing of the moment frame when a lateral force is applied to the moment frame, wherein all sides of the vertical posts include two vertical rows of spaced apart bolt holes for receiving bolts when the load beams and cross beams are attached to sides of the vertical posts, the vertical posts being configured to allow for width expansion of the moment frame whereby additional cross beams are attachable to the vertical posts at the same height as the first set of cross beams.

2. The moment frame as described in claim 1 further including a second set of load beams, the second set of load beams including a first angular, hollow metal, horizontal load beam, opposite ends of the first load beam including L shaped flange connectors attached to the first and second vertical posts, the second set of load beams including a second angular, hollow metal, horizontal load beam, opposite ends of the second load beam including L shaped flange connectors attached to the third and fourth vertical posts, the first and second load beams parallel to each other and disposed at the same height above the floor surface; and a second set of cross beams, the second set of cross beams including a first angular, hollow metal, horizontal cross beam, opposite ends of the first cross beam including U shaped saddle connectors attached to the first and third vertical posts, the second set of cross beams including a second angular, hollow metal, horizontal cross beam, opposite ends of the second cross beam including U shaped saddle connectors releasably attached to the second and fourth vertical posts, the first and second cross beams parallel to each other and disposed at the same height above the floor surface.

* * * * *